US010360065B2

(12) United States Patent
Gui et al.

(10) Patent No.: US 10,360,065 B2
(45) Date of Patent: Jul. 23, 2019

(54) SMART REDUCE TASK SCHEDULER

(71) Applicant: International Business Machines Corporation, Armonk, NY (US)

(72) Inventors: HaoChen Gui, Shanghai (CN); Yang Liu, Shanghai (CN); Guang Han Sui, Beijing (CN); Ting Wang, Shanghai (CN); ZhiZhi Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 15/259,207

(22) Filed: Sep. 8, 2016

(65) Prior Publication Data
US 2018/0067764 A1    Mar. 8, 2018

(51) Int. Cl.
G06F 9/46     (2006.01)
G06F 9/48     (2006.01)
(52) U.S. Cl.
CPC .................................. G06F 9/4881 (2013.01)
(58) Field of Classification Search
None
See application file for complete search history.

(56) References Cited

U.S. PATENT DOCUMENTS

| 8,972,986 | B2 | 3/2015 | Palanisamy et al. |
| 2013/0254196 | A1 | 9/2013 | Babu et al. |
| 2014/0226975 | A1 | 8/2014 | Zhang et al. |
| 2014/0358977 | A1 | 12/2014 | Cramer et al. |

| 2015/0150017 | A1* | 5/2015 | Hu .......................... G06F 12/00 718/103 |
| 2015/0150018 | A1 | 5/2015 | Hu et al. |
| 2017/0185485 | A1* | 6/2017 | Cuddihy ............... G06F 11/142 |

OTHER PUBLICATIONS

Davidson et al., "Optimizing Shuffle Performance in Spark," Final Project, Advanced Topics in Computer Science, University of California, Berkeley, Fall 2013, 10 pages.
Shi et al., "Smart Shuffling in MapReduce: a solution to Balance Network Traffic and Workloads," 2015 IEEE/ACM 8th International Conference on Utility and Cloud Computing (UCC), Dec. 2015, pp. 35-44, IEEE. DOI: 10.1109/UCC.2015.18.
Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

* cited by examiner

Primary Examiner — Kenneth Tang
(74) Attorney, Agent, or Firm — Nathan M. Rau (57) ABSTRACT

A system and a method for scheduling a reduce task on nodes is disclosed. The various nodes in a cluster of nodes are bucketized into intermediate data items. A counter is created that provides a count of the intermediate data items that are placed into the each of the buckets for the node. This counter value is provided to a scheduler. From the counter information the scheduler is able to determine the cost of moving the intermediate data for the bucket to different ones of the nodes. Once the cost of moving the intermediate data is determined the scheduler is able to determine which of the nodes should perform the reduce task for that particular bucket. The scheduler minimizes the amount of shuffling of the intermediate data between the nodes for each of the buckets, by determining the lowest cost shuffle option for each of the buckets.

16 Claims, 8 Drawing Sheets

SMART REDUCE TASK SCHEDULER

BACKGROUND

The present disclosure relates scheduling reduce tasks in a MapReduce framework, and more specifically, to minimizing the cost of shuffling intermediate data following the finishing of the mapping task.

Intermediate data shuffling is a bottleneck in the MapReduce framework, especially in systems where all of the computing nodes start shuffling the intermediate data immediately after all of the map tasks finish. The intermediate data is mostly in the memory in these scenarios. At this time the network input/output bursts such that the shuffling of the intermediate data takes a long time. For a large cluster (e.g. hundreds or thousands of nodes) which do not have a high network bandwidth between each the nodes, the poor performance of shuffling is a pain point for users and administrators.

SUMMARY

According to embodiments of the present disclosure, a system and a method for scheduling a reduce task on nodes is disclosed. In a MapReduce environment the data for the various nodes in a cluster of nodes is bucketized into intermediate data items. A counter is created that provides a count of the intermediate data items that are placed into the each of the buckets for the node. This counter value is provided to a scheduler. Once all of the nodes have been mapped and the bucketized data has been created the scheduler analyzes the counter information. From the counter information the scheduler is able to determine the cost of moving the intermediate data for the bucket to different ones of the nodes. Once the cost of moving the intermediate data is determined the scheduler is able to determine which of the nodes should perform the reduce task for that particular bucket. The scheduler minimizes the amount of shuffling of the intermediate data between the nodes for each of the buckets, by determining the lowest cost shuffle option for each of the buckets.

In one embodiment a system for scheduling reduce tasks including at least one processor and at least one memory component is disclosed. The system includes at least one mapper configured to bucketize intermediate data associated with a node from a plurality of nodes into a plurality of buckets across each of the plurality of nodes. The system further includes a scheduler configured to determine a node from the plurality of nodes to execute a reduce task for a particular one of the plurality of buckets based upon a minimum shuffle cost calculation, and to schedule the reduce task for the particular one of the plurality of buckets on the determined node. A shuffler is provided and configured to move the intermediate data associated with the particular one of the plurality of buckets from the other nodes in the plurality of nodes to the determined node. The reduce task assigned to the node is then performed by a reducer.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to minimizing the costs associated with the shuffling of intermediate data items in a MapReduce task by focusing the shuffling process on moving fewer intermediate data items between the nodes. While the present disclosure is not necessarily limited to such applications, various aspects of the disclosure may be appreciated through a discussion of various examples using this context.

Figure 1:
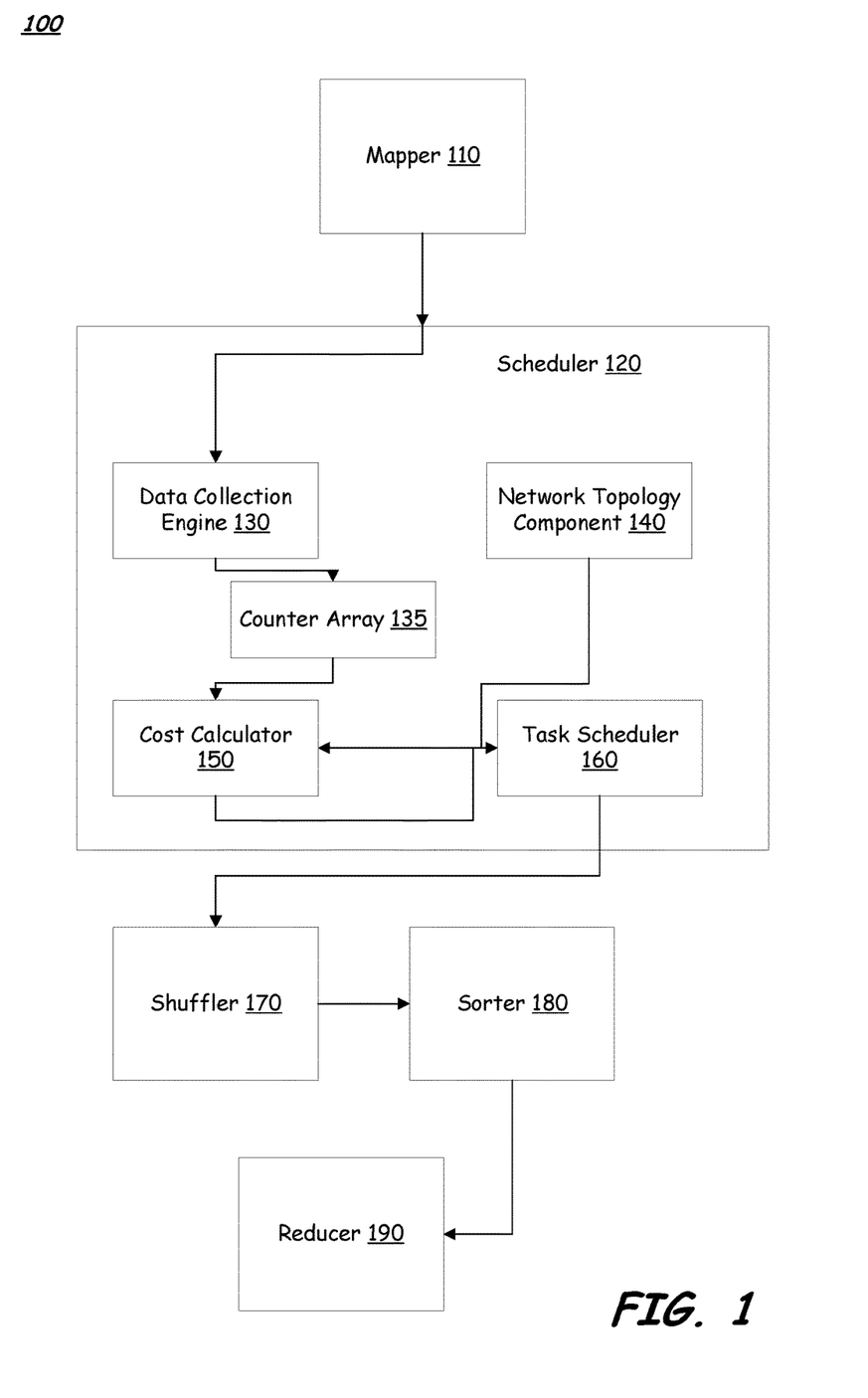
FIG. 1 is a block diagram illustrating MapReduce system according to one illustrative embodiment.

FIG. 1 is a block diagram illustrating a system 100 for executing a MapReduce function using a scheduler 120 according to one illustrative embodiment. The scheduler 120 is configured to interject itself between a mapper 110 and a shuffler 170, and to arrange the reduce tasks on each node in a way that reduces the amount of shuffling of data between the nodes by assigning the reduce tasks to the nodes that have more local intermediate data than other nodes (referred to herein as data items or items). The scheduler 120 receives the mapped partitions and data from the mapper 110, and provides a schedule to the shuffler 170 of which nodes should process which buckets for the reduce task. The scheduler 120 includes a data collection engine 130, a network topology component 140, a cost calculator 150 and a task scheduler 160. Prior system 100s assigned the reduce tasks to the nodes with little or no concern for the amount of shuffling that is required to get the data items to the assigned node. In contrast the scheduler 120 considers the shuffle cost of moving the items between the nodes.

Figure 2:
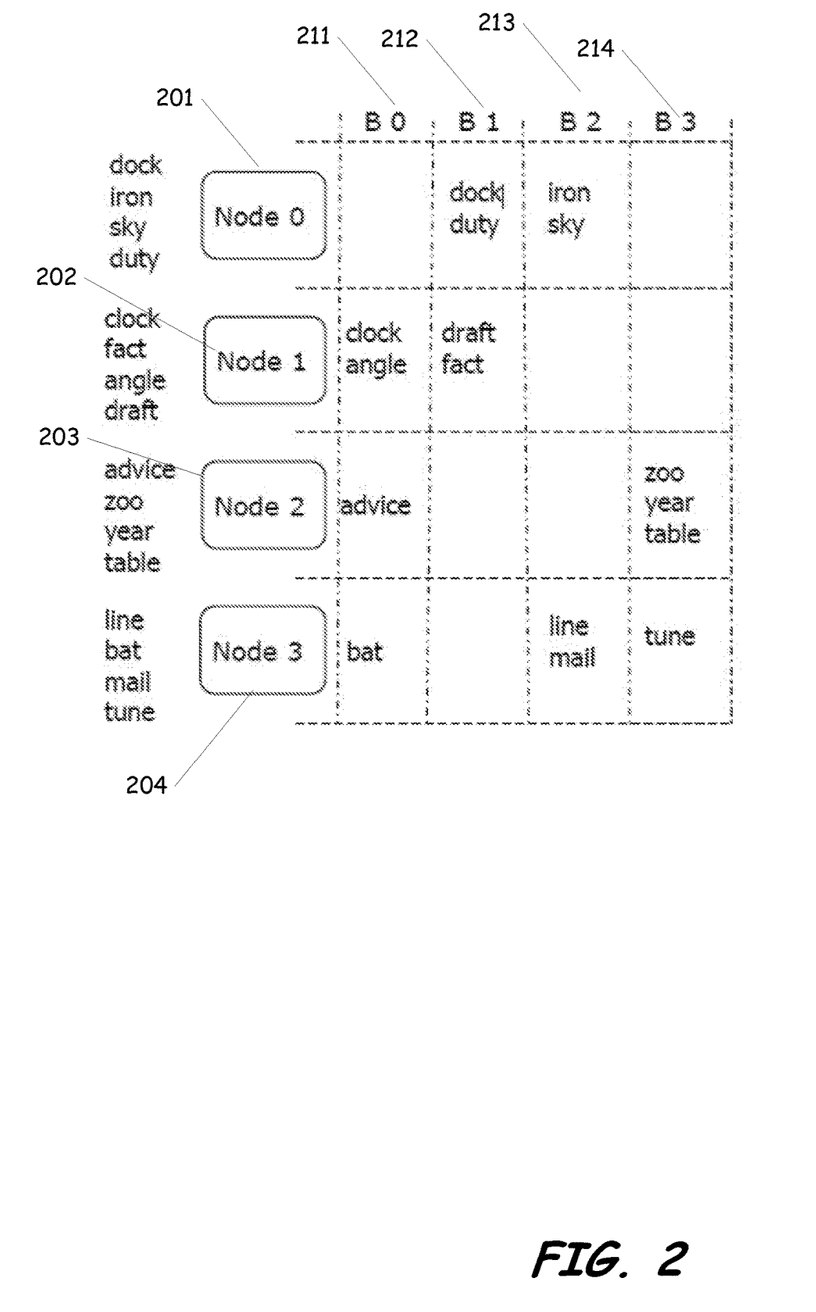
FIG. 2 is a diagrammatic illustration of intermediate data items bucketized on nodes according to an illustrative embodiment.

The mapper 110 is a component of system 100 that bucketizes the data that is present on each node. Each node is processed through the mapper 110 separately. However, there may be multiple mapper 110s present and the processing for each node may be done in parallel using different mapper 110s for each node. The mapper 110 maps data items held by a particular node to a number of buckets. Specifically, the mapper 110 breaks individual elements down into tuples (key/value pairs) and assigns or determines which bucket the tuple belongs to. FIG. 2 illustrates a simplified example of the results of the mapper 110 in bucketizing the tuples across four nodes 201, 202, 203 and 204, and four buckets 211, 212, 213 and 214. While only four nodes and buckets are illustrated in FIG. 2 any number of nodes and buckets may be present. The items in each node/bucket combination are represented by words. In some embodiments the number of nodes and buckets may reach into the millions of nodes or buckets having data related to the cluster. The process for bucketizing the data across the nodes will not be discussed in greater detail. However, it should be noted that any process for bucketizing the input data through a mapper 110 can be used. The mapper 110 adds a counter for each bucket on each node prior to passing the data contained therein to the scheduler 120. The counter indicates the number of items that were generated for each bucket for the particular node.

The data collection engine 130 receives from each mapper 110 the counter values for each node indicating the number of items contained in each bucket for that node. As illustrated in FIG. 2 a particular node may or may not have items in a particular bucket. The data collection engine 130 acts an aggregator in determining the number of tuples that are present for a particular bucket on a particular node. This information may be stored in a counter array 135 maintained by the data collection engine 130. Each node bucket combination is assigned its own value by the data collection engine 130. Thus, the number of counters present is the number of nodes multiplied by the number of buckets. In the example of FIG. 2, there would be 16 counters in the counter array 135. However, in other embodiments the data collection engine 130 can maintain counters for the nodes according to other approaches. As each node is processed by the mapper 110 the data collection engine 130 is updated with the corresponding count data.

The network topology component 140 is a component of the scheduler 120 that is configured to determine the arrangement of the nodes within the cluster. The determination here is to identify all of the nodes in the cluster. In some instances, a particular node may not have any items associated with it, but still may be a portion of the cluster. As such simply relying on the information contained in the data collection engine 130 may not give an accurate representation of the cluster and of the nodes that are available for processing the reduce task. In some embodiment the network bandwidth information is gather. This information may relate to the performance capabilities of the nodes within the network. This network information is in one embodiment gathered across the entire cluster topology. However, in some embodiments only a portion of the cluster topology is used to gather the network bandwidth and/or topology information.

The cost calculator 150 is a component of the scheduler 120 that is configured to determine the cost of moving data items within a bucket from one node to another node in preparation for a reduce task. As mentioned earlier, prior systems assigned a particular node a reduce task for a bucket with no concern for the processing and time costs associated with the shuffling of the items from the original node to the node that will process the reduce task. The cost calculator 150 receives from the data collection engine 130 the counter array 135, and from the network topology component 140 the nodes in the cluster. The cost calculator 150 considers, for each bucket the cost of moving the items from their home node to the node that will process the reduce task. In one embodiment the number of items that have to be moved to the target node is considered the cost. However, in other embodiments the time to move particular items can be considered. If a particular item in a bucket is larger in size than other items in the bucket the time to transfer that item may be greater than the time to move other items to that node. The cost calculator 150 can consider all of the potential moves in determining the cost of moving the items to the particular node. For example, referring back to FIG. 2, the cost calculator 150 can determine that for the first bucket moving the items to the first node 201 would require moving four items (2 from node 202, 1 from node 203 and 1 from node 204), moving the items to the second node 202 would require moving two items (1 from node 203 and one from node 204), moving the items to the third node 203 would require moving three items (2 from node 202 and 1 from node 204), and that moving the items to the fourth node 204 would require moving three items (2 from node 202 and 1 from node 203. Thus the costs would be 4, 2, 1, and 1 respectively. The cost calculator 150 performs this cost calculation for all of the nodes and all of the buckets present.

The task scheduler 160 is a component of the scheduler 120 that is configured to assign the reduce tasks to particular nodes. The task scheduler 160 receives from the cost calculator 150 the costs associated with moving the items in each bucket to each node. Using this data the task scheduler 160 assigns to each node the reduce task that has the lowest cost associated with moving items to that node from the other nodes for a particular bucket. The task scheduler 160 can assign the reduce task on a node basis or on a bucket basis. That is the task scheduler 160 can determine what bucket the first node 201 should process based on the cost, or it can determine what node should process the first bucket 211 based on the cost for the bucket 211. The task scheduler 160 continues on this process for each node and/or bucket in the cluster.

Assuming that the task scheduler 160 is using the node approach, and with reference to FIG. 2, the task scheduler 160 would determine which bucket node 201 should process. In this example, the task scheduler 160 would determine that the shuffle cost for node 201 to process bucket 211 would be 4, to process bucket 212 would be 2, to process bucket 213 would be 2, and to process bucket 214 would be 4. As such, the task scheduler 160 determines that processing buckets 212 and 213 would have the same cost. However, as the node 201 can only process one reduce task, the task scheduler 160 would assign the reduce task for bucket 212 to the node 201. It could of course decide to assign node 201 to bucket 213 instead. With node 201 assigned, the task scheduler 160 would repeat the process for each of the remaining nodes.

Assuming that the task scheduler 160 is using the bucket approach, and again with reference to FIG. 2, the task scheduler 160 would determine which node should process bucket 211. In this example, the task scheduler 160 would determine that the shuffle cost for node 201 to process the bucket would be 4, for node 202 it would be 2, for node 203 it would be 3 and for node 204 it would be 3. As such, the task scheduler 160 determines that the processing of bucket 211 should be performed by node 202. Again the process repeats itself for each of the remaining buckets. It should be noted that in the example of FIG. 2 that the shuffle costs for node 201 and node 202 to process bucket 212 is the same. However, as node 202 has already been assigned to process bucket 211 the task scheduler 160 will assign the reduce task to the next node having the lowest shuffle cost. This would hold true even if nodes 201 and 202 were not equal in the shuffle costs.

In some embodiments the task scheduler 160 regardless of if it is using the node first or the bucket first approach analyzes and assigns the tasks starting with the node/bucket combination that has the lowest shuffle cost. For example, again referring back to FIG. 2, the node/bucket combination with the fewest moves required is node 203 and bucket 214. The task scheduler 160 recognizing that this is the lowest cost would assign the reduce task to this node/bucket combination first, and then proceeds to process the other nodes or buckets. In this way, the task scheduler 160 is able to ensure that the lowest cost node/bucket combinations are handled by the appropriate nodes, and that particular node does not get assigned a higher shuffle cost task based upon the topology of the cluster and the direct approach discussed above.

Figure 3:
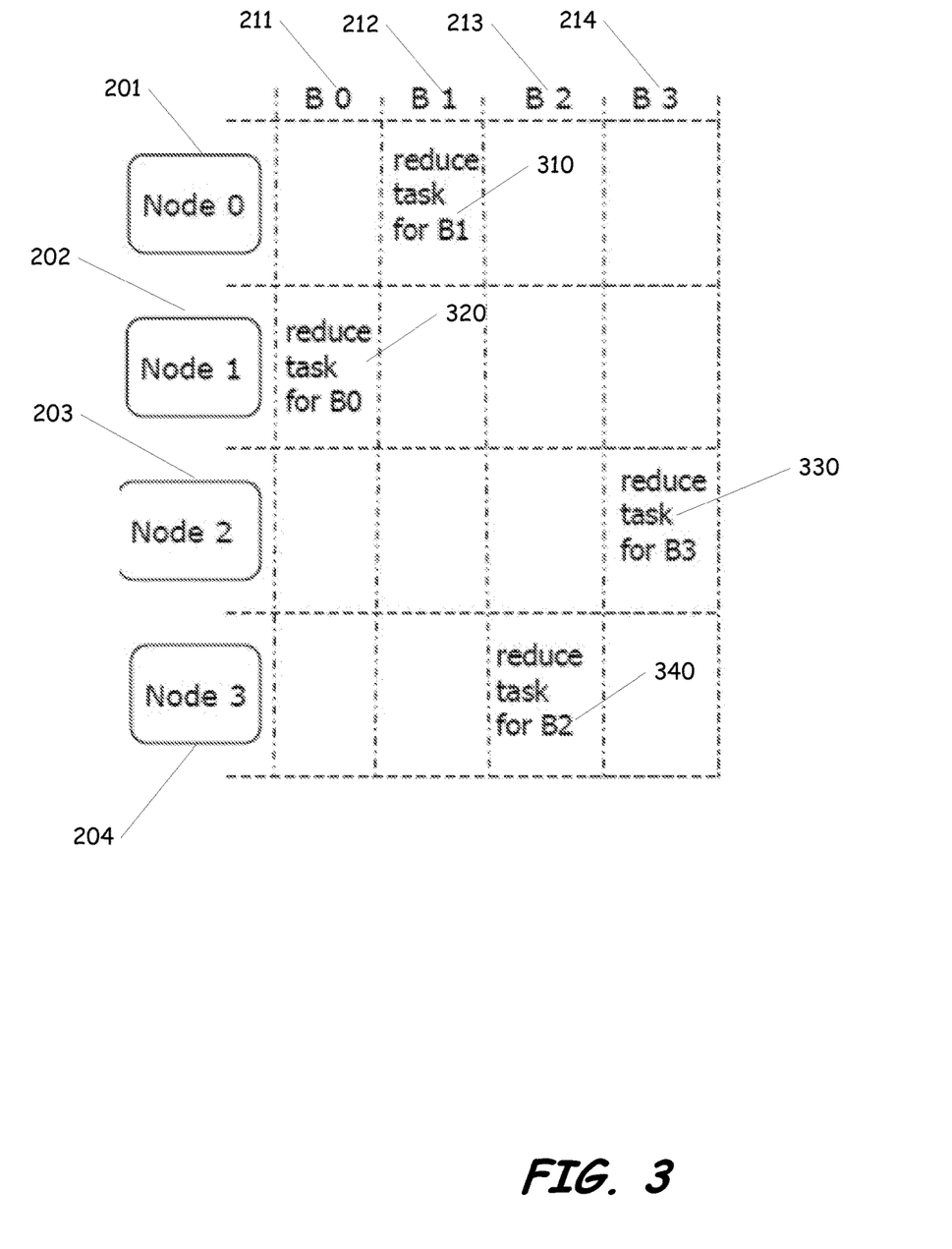
FIG. 3 is a diagrammatic illustration of the assignment of reduce tasks to the nodes according to an illustrative embodiment.

An example of the task assignments is illustrated in FIG. 3. Illustrated therein it is shown that node 201 has been assigned the reduce task for bucket 212 at 310, that node 202 has been assigned the reduce task for bucket 211 at 320, that node 203 has been assigned the reduce task for bucket 214 at 312, and that node 204 has been assigned the reduce task for bucket 213.

Figure 4:
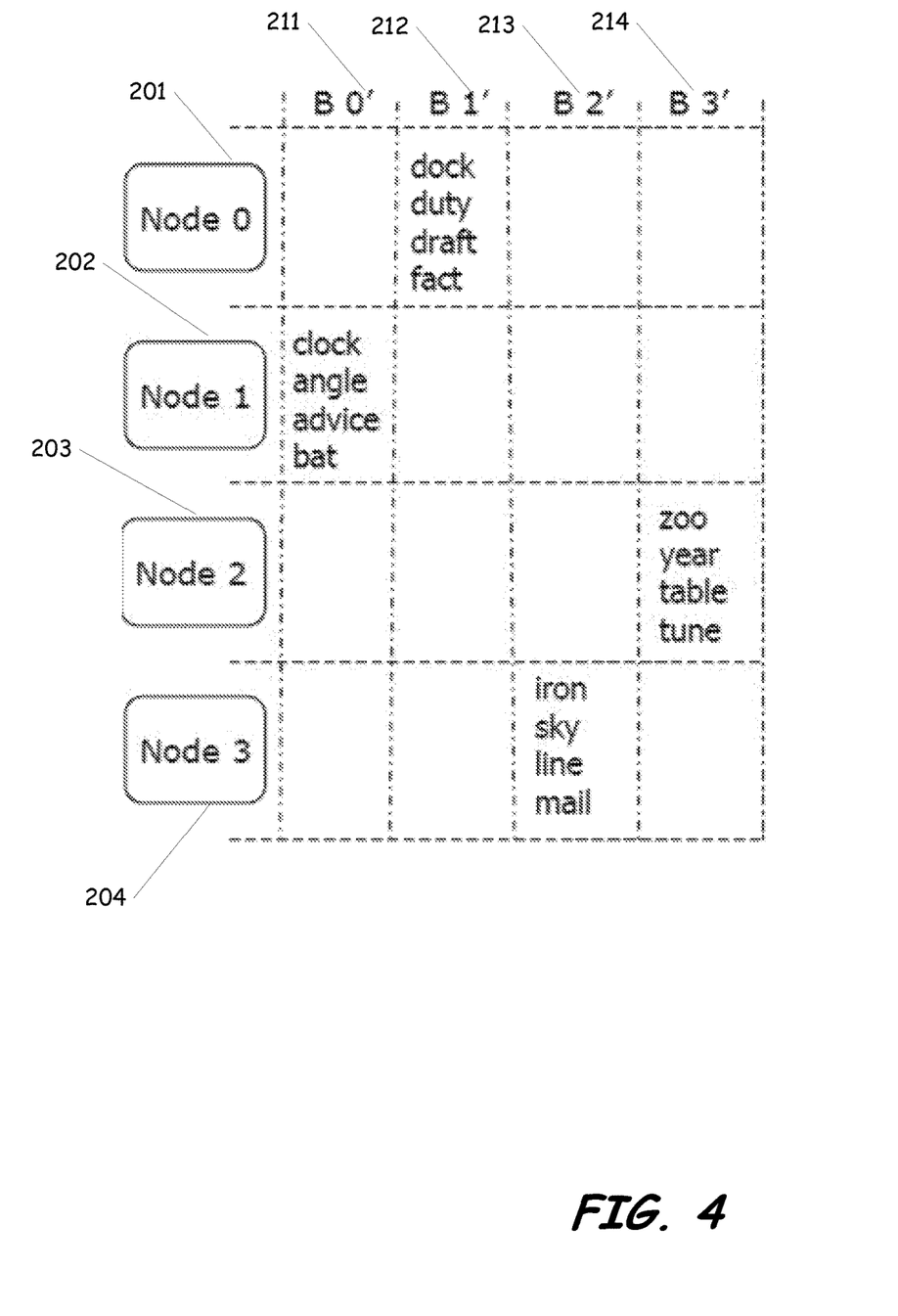
FIG. 4 is a diagrammatic illustration of the intermediate data items following shuffling according to an illustrative embodiment.

The shuffler 170 is a component of the system 100 that is configured to move the items in a bucket from the node they currently residing on to the node that will be processing that bucket. The process of shuffling will not be discussed in detail herein, but any method or process for shuffling the items can be used. The shuffler 170 receives from the scheduler 120 and the task scheduler 160 the assignment of the nodes to process each bucket. The shuffler 170 then moves the items according to the assignments that were generated by the task scheduler 160. Applying the assigned tasks illustrated in FIG. 3 and the items for each bucket illustrated in FIG. 2, the items are shuffled or moved to the corresponding assigned node. This is illustrated in FIG. 4 where the words for bucket 211 are now all on node 202, the words for bucket 212 are now on node 201, the words for bucket 213 are now on node 204 and the words for bucket 214 are now on node 203.

Sorter 180 and reducer 190 are also illustrated in FIG. 1. The operation of these two components are not discussed in detail herein, but are merely illustrated to complete the MapReduce system 100. The sorter 180 in some embodiment receives the shuffled data from the shuffler 170 and sorts the data. In other embodiments the sorter 180 sorts the data at the same time the data is being shuffled. The sorted data is then presented to the reducer 190 for the processing of the reduce task.

Figure 5:
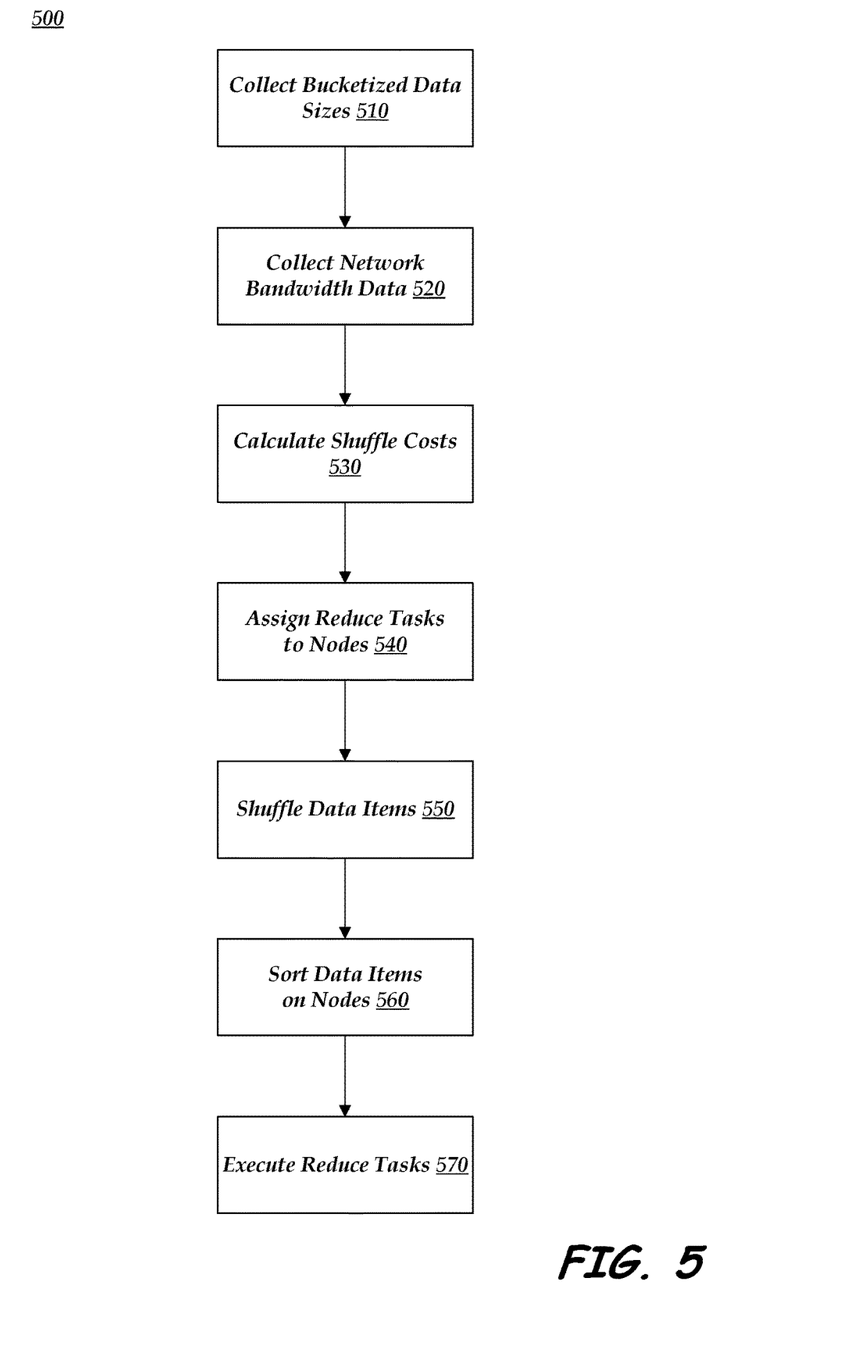
FIG. 5 is a flow diagram illustrating a process for scheduling reduce tasks according to illustrative embodiments.

FIG. 5 is a flow diagram illustrating a process for scheduling reduce tasks according to one illustrative embodiment. The reduce tasks are assigned to the corresponding node that results in the lowest shuffle cost for moving items to that particular node from within the bucket.

The process begins by collecting bucketized data sizes for each node. This is illustrated at step 510. The data will have already been bucketized by the mapper. The process of bucketization is not discussed in detail herein, though any process can be used. During the bucketization process the mapper may generate a counter for each tuple that the mapper put in a particular bucket. The data sizes are the particular number of items (or tuples) that are present in the bucket for the corresponding node. A node may have any number of items in a particular bucket. Further, the node may have multiple items in different buckets. At this step the number of items in each bucket is added to the counter array. This collection of data sizes occurs for all of the nodes and all of the buckets that are present.

Following the collection of the data sizes, network bandwidth information is gathered. This is illustrated at step 520. This network information is in one embodiment gathered across the entire cluster topology. However, in some embodiments only a portion of the cluster topology is used to gather the network bandwidth information. In some embodiments steps 510 and 520 are performed at the same time. However, in other embodiments step 520 can occur prior to step 510. In some embodiment the network topology is gathered at this step as well.

Next a shuffle cost is calculated. This is illustrated at step 530. The shuffle cost is in one embodiment the transfer time required to move data between each of the buckets or nodes. The shuffle cost is calculated based upon the data size and the network bandwidth. However, in other embodiments other information may be used to determine the shuffle cost. This information can include for example, node locations, bucket locations, node priority, etc. At this step for each bucket the cost of moving the items from their home node to the node that will process the reduce task is determined. In one embodiment the number of items that have to be moved to the target node is considered the cost. However, in other embodiments the time to move particular items can be considered. If a particular item in a bucket is larger in size than other items in the bucket the time to transfer that item may be greater than the time to move other items to that node. In some embodiments all of the potential moves are used in determining the cost of moving the items to the particular node. For example, referring back to FIG. 2, the cost calculator can determine that for the first bucket moving the items to the first node 201 would require moving four items (2 from node 202, 1 from node 203 and 1 from node 204), moving the items to the second node 202 would require moving two items (1 from node 203 and one from node 204), moving the items to the third node 203 would require moving three items (2 from node 202 and 1 from node 204), and that moving the items to the fourth node 204 would require moving three items (2 from node 202 and 1 from node 203. Thus the costs would be 4, 2, 1, and 1 respectively. This cost calculation is performed for all of the nodes and all of the buckets present. However, in some embodiments only those nodes/buckets that are populated are considered.

After the shuffle cost has been calculated the reduce tasks are assigned to the corresponding nodes. This is illustrated at step 540. At this step the costs associated with moving the items in each bucket to each node are received. Using this data each node is assigned the reduce task that has the lowest cost associated with moving items to that node from the other nodes for a particular bucket. This analysis can be done on a node basis or on a bucket basis. That is the process can determine what bucket the first node 201 should process based on the cost, or it can determine what node should process the first bucket 211 based on the cost for the bucket 211. This process is repeated for each node and/or bucket in the cluster.

Assuming that process is using the node approach, and with reference to FIG. 2, the step 540 determines which bucket node 201 should process. In this example, it would determine that the shuffle cost for node 201 to process bucket 211 would be 4, to process bucket 212 would be 2, to process bucket 213 would be 2, and to process bucket 214 would be 4. As such, step 540 determines that processing buckets 212 and 213 would have the same cost. However, as the node 201 can only process one reduce task, step 540 can assign the reduce task for bucket 212 to the node 201. It could of course assign node 201 to bucket 213 instead. With node 201 assigned, step 540 would repeats for each of the remaining nodes.

Assuming that the process is using the bucket approach, and again with reference to FIG. 2, step 540 would determine which node should process bucket 211. In this example, step 540 determines that the shuffle cost for node 201 to process the bucket would be 4, for node 202 it would be 2, for node 203 it would be 3 and for node 204 it would be 3. As such, step 540 determines that the processing of bucket 211 should be performed by node 202. Again the process repeats itself for each of the remaining buckets. It should be noted that in the example of FIG. 2 that the shuffle costs for node 201 and node 202 to process bucket 212 is the same. However, as node 202 has already been assigned to process bucket 211 step 540 will assign the reduce task to the next node having the lowest shuffle cost. This would hold true even if nodes 201 and 202 were not equal in the shuffle costs.

In some embodiments step 540 analyzes and assigns the tasks starting with the node/bucket combination that has the lowest shuffle cost. For example, again referring back to FIG. 2, the node/bucket combination with the fewest moves required is node 203 and bucket 214. Recognizing that this is the lowest cost step 540 would assign the reduce task to this node/bucket combination first, and then proceeds to process the other nodes or buckets. In this way, the process is able to ensure that the lowest cost node/bucket combinations are handled by the appropriate nodes, and that particular node does not get assigned a higher shuffle cost task based upon the topology of the cluster and the direct approach discussed above.

After the reduce tasks have been assigned to the corresponding nodes the data items are moved from their corresponding original nodes to their assigned nodes. This is illustrated at step 550 as shuffle the data. The actual process of shuffling will not be discussed in detail herein, but any method or process for shuffling the items can be used. At this step the items are moved according to the assignments that were generated at step 540. Applying the assigned tasks illustrated in FIG. 3 and the items for each bucket illustrated in FIG. 2, the items are shuffled or moved to the corresponding assigned node. This is illustrated in FIG. 4 where the words for bucket 211 are now all on node 202, the words for bucket 212 are now on node 201, the words for bucket 213 are now on node 204 and the words for bucket 214 are now on node 203.

At the same time as the shuffling step 550 or thereafter, the data items are sorted. This is illustrated at step 560. The process of sorting the data items can be done by any method or process for sorting the items. Following the sorting and shuffling of the items the reduce task is performed by each node. This is illustrated at step 570.

Figure 6:
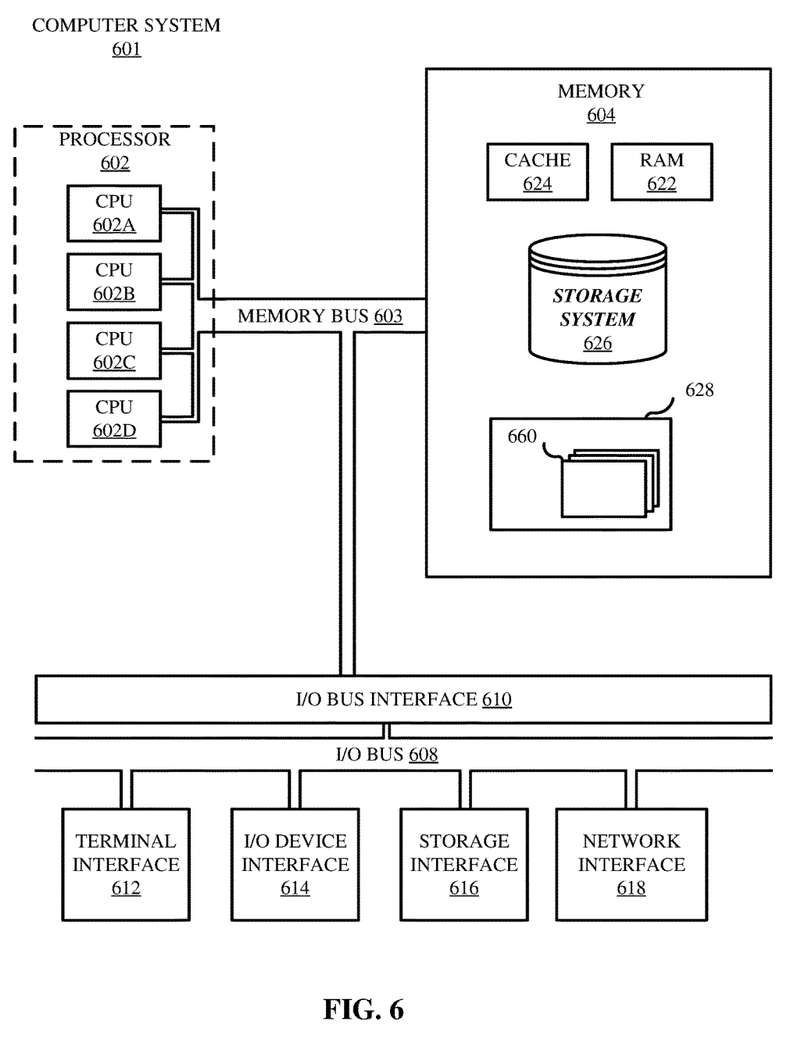
FIG. 6 is a block diagram illustrating a computing system according to one embodiment.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 660 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 660 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
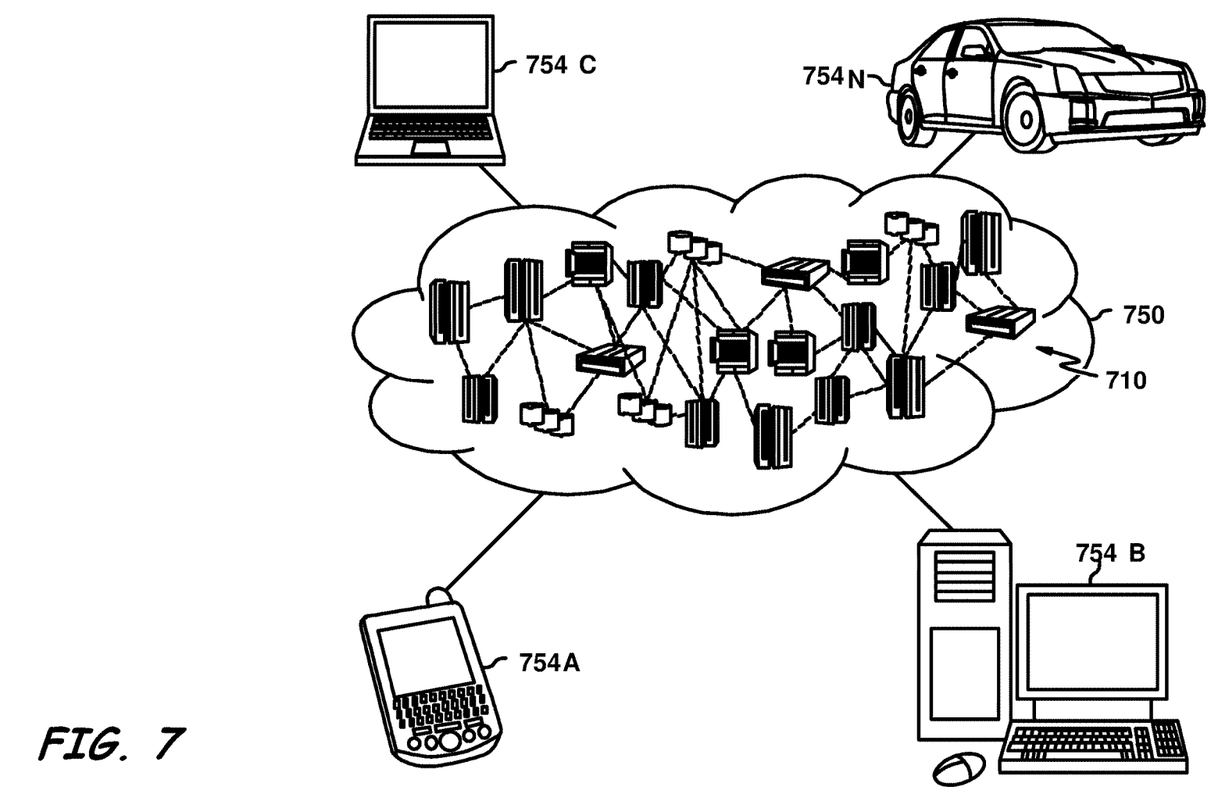
FIG. 7, is a diagrammatic representation of an illustrative cloud computing environment.

The system 100 and the scheduler 120 may be employed in a cloud computing environment. FIG. 7, is a diagrammatic representation of an illustrative cloud computing environment 750 according to one embodiment. As shown, cloud computing environment 750 comprises one or more cloud computing nodes 410 with which local computing devices used by cloud consumers, such as, for example, personal digital assistant (PDA) or cellular telephone 754A, desktop computer 754B, laptop computer 754C, and/or automobile computer system 754N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 10 and cloud computing environment 750 may communicate with any type of computerized device over any type of network and/or network addressable connection (e.g., using a web browser).

Figure 8:
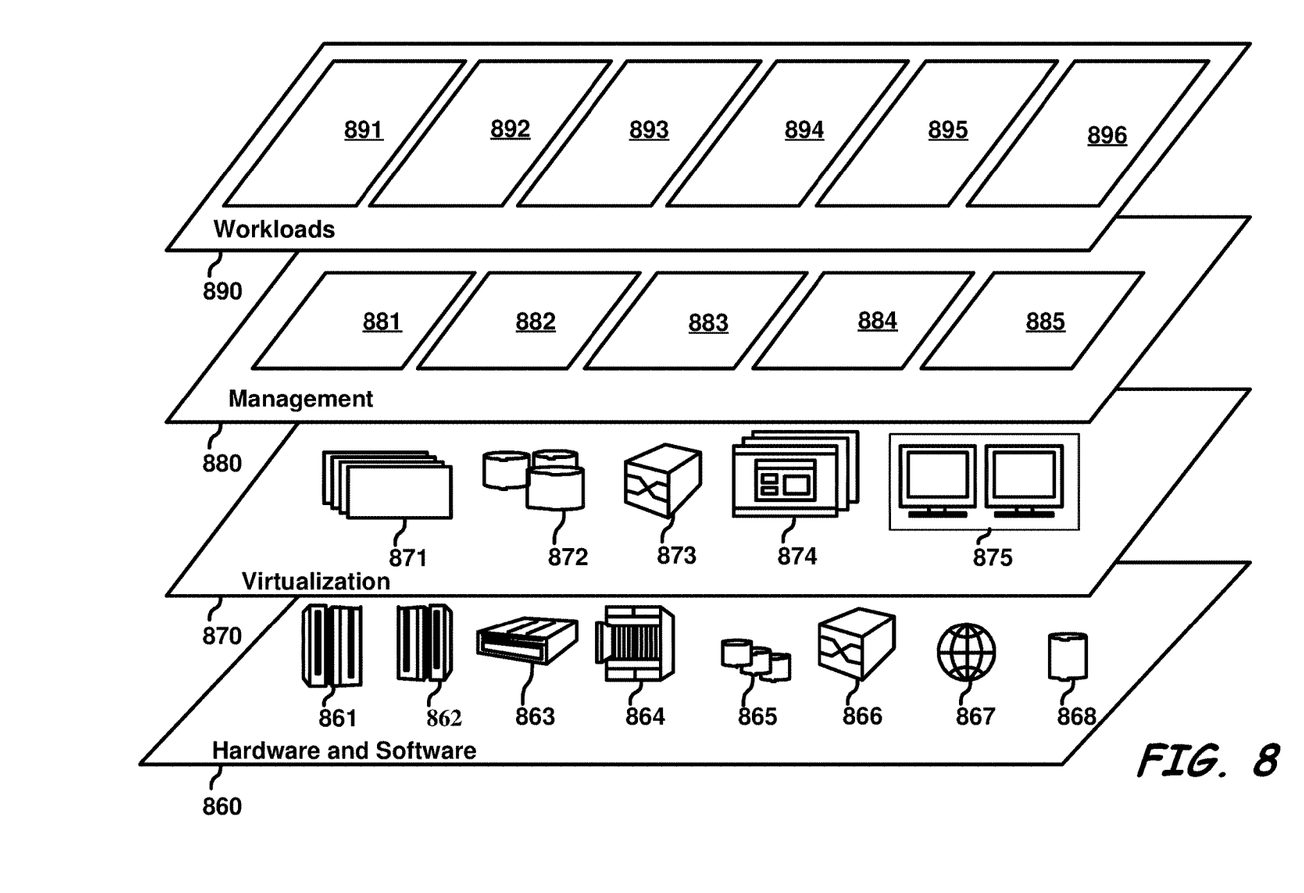
FIG. 8 illustrates a set of functional abstraction layers provided by cloud computing environment according to one illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for scheduling reduce tasks, comprising:
   at least one processor,
   at least one memory component;
   at least one mapper configured to bucketize intermediate data associated with a node from a plurality of nodes into a plurality of buckets across each of the plurality of nodes;
   a scheduler configured to determine a node from the plurality of nodes to execute a reduce task for a particular one of the plurality of buckets based upon a minimum shuffle cost calculation, and to schedule the reduce task for the particular one of the plurality of buckets on the determined node;
   a shuffler configured to move intermediate data associated with the particular one of the plurality of buckets from other nodes in the plurality of nodes to the determined node, at the same time the intermediate data is sorted; and
   a reducer configured to execute a reduce task.

2. The system of claim 1 wherein the scheduler further comprises:
   a data collection engine configured to determine a number of intermediate data associated with each of the plurality of buckets on each of the plurality of nodes;
   a cost calculator configured to determine a shuffle cost associated with moving intermediate data associated with each of the plurality of buckets to each one of the plurality of nodes; and
   a task scheduler configured to determine a node/bucket location for the intermediate data in a bucket based upon the minimum shuffle cost calculation.

3. The system of claim 2 wherein the task scheduler determines the node/bucket location on a node basis.

4. The system of claim 2 wherein the task scheduler determines the node/bucket location on a bucket basis.

5. The system of claim 2 wherein the task scheduler determines the node/bucket location based upon an identification of an available node/bucket location having a lowest shuffle cost of all remaining node/bucket locations.

6. The system of claim 2 wherein the mapper is configured to provide to the scheduler a counter for each bucket of the plurality of buckets on a node that indicates a number of intermediate data placed in each of the plurality of buckets.

7. The system of claim 6 wherein the data collection engine is configured to place the received counter into a counter array.

8. A method of scheduling a reduce task, comprising:
   collecting bucketized data sizes for each of a plurality of buckets on a plurality of nodes;
   calculating shuffle costs associated with moving intermediate data items in each of the plurality of buckets to one of the plurality of nodes;
   for each of the buckets in the plurality of buckets, assigning a reduce task to one node of the plurality of nodes based on a minimum shuffle cost for moving the corresponding intermediate data items from other ones of the plurality of nodes to the one node;
   shuffling the intermediate data items to the one node based on the assigned reduce task;
   sorting the intermediate data items for each bucket at the same time as shuffling; and
   executing the reduce task on the one node;
   wherein the instruction to collect bucketized data sizes places a counter value for each of the plurality of buckets into a counter array.

9. The method of claim 8 wherein assigning the reduce task is performed on a node basis.

10. The method of claim 8 wherein assigning the reduce task is performed on a bucket basis.

11. The method of claim 8 wherein assigning the reduce task is performed based on upon an identification of an available node/bucket location having a lowest shuffle cost of all remaining node/bucket locations.

12. The method of claim 8 wherein collecting bucketized data sizes places a counter value for each of the plurality of buckets into a counter array.

13. A computer program product, embodied on a computer readable storage medium, for scheduling a reduce task having computer executable instructions that when executed cause a computer to:
- collect bucketized data sizes for each of a plurality of buckets on a plurality of nodes;
- calculate shuffle costs associated with moving intermediate data items in each of the plurality of buckets to one of the plurality of nodes;
- for each of the buckets in the plurality of buckets, assign a reduce task to one node of the plurality of nodes based on a minimum shuffle cost for moving the corresponding intermediate data items from other ones of the plurality of nodes to the one node;
- shuffle the intermediate data items to the one node based on the assigned reduce task;
- sorting the intermediate data items for each bucket at the same time as shuffling; and
- execute the reduce task on the one node;
- wherein the instruction to collect bucketized data sizes places a counter value for each of the plurality of buckets into a counter array.

14. The computer program product of claim 13 wherein the instruction to assign the reduce task is performed on a node basis.

15. The computer program product of claim 13 wherein the instruction to assign the reduce task is performed on a bucket basis.

16. The computer program product of claim 13 wherein the instruction to assign the reduce task is performed based on upon an identification of an available node/bucket location having a lowest shuffle cost of all remaining node/bucket locations.

* * * * *